Figure 1:
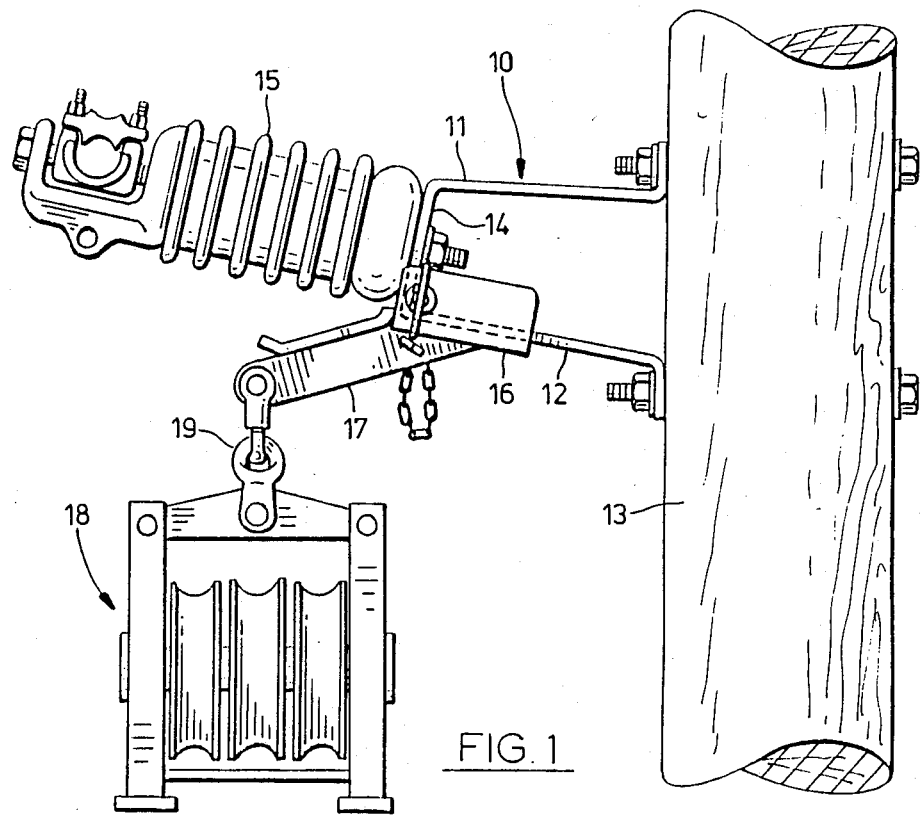

United States Patent [19]

Hoekstra

[11] Patent Number: 4,907,782
[45] Date of Patent: Mar. 13, 1990

[54] TENSIONING STRINGING DAVIT FOR POWER LINES

[76] Inventor: Jurrien Hoekstra, P.O. Box 396, 36 King Street, Tottenham, Ontario, Canada, L0G 1W0

[21] Appl. No.: 215,768
[22] Filed: Jul. 6, 1988
[30] Foreign Application Priority Data
Jul. 20, 1987 [CA] Canada ................... 542,487
[51] Int. Cl.⁴ ........................................... B65H 59/00
[52] U.S. Cl. .................... 254/134.3 PA; 254/134.3 R; 248/218.4
[58] Field of Search ............... 254/134.3 R, 134.3 PA; 114/368, 377; 248/317, 218.4; 403/378, 379, 374

[56] References Cited
U.S. PATENT DOCUMENTS

| | | |
|---|---|---|
| 521,125 | 6/1894 | Philips .......................... 254/134.3 R |
| 2,073,566 | 3/1937 | Scheubner . |
| 2,213,604 | 9/1940 | Lennert . |
| 2,553,779 | 5/1951 | McLain et al. . |
| 2,838,279 | 6/1958 | Parkyn . |
| 2,902,257 | 9/1959 | Young . |
| 2,946,559 | 7/1960 | Pickett . |
| 3,130,958 | 4/1964 | McAuley . |
| 3,191,910 | 6/1965 | Eitel . |
| 3,204,309 | 9/1965 | Ricker .......................... 254/134.3 R |
| 3,853,304 | 12/1974 | Jackson . |

FOREIGN PATENT DOCUMENTS 1297717  8/1971  United Kingdom ................ 248/317

Primary Examiner—Frederick R. Schmidt
Assistant Examiner—David A. Holmes
Attorney, Agent, or Firm—Ridout & Maybee

[57] ABSTRACT

A tension stringing davit for use in the stringing of power transmission lines between utility poles attaching temporary side guy cables, and maintenance of power transmission lines, is adapted to be mounted directly on an insulator stand-off bracket instead of the pole. The davit comprises essentially a channel-shaped plate providing a rectangular channel to receive and accommodate the lower arm of the insulator bracket, a projecting arm for suspending cable hoisting or supporting equipment, and temporary side guy cables, welded to the underside of the plate, and a gusset plate welded to the front edge of the plate and the top edge of the projecting arm to provide a rigid assembly. The davit is secured to the insulator bracket by means of a pin which extends between side flanges of the channel-shaped plate.

7 Claims, 1 Drawing Sheet

TENSIONING STRINGING DAVIT FOR POWER LINES

This invention relates to tension stringing davits used in the stringing of power transmission lines between utility poles, erection of utility poles, and maintenance of power transmission lines, where line-supporting insulators are mounted on the poles by stand-off brackets. An insulator stand-off bracket is typically a bifurcated member having upper and lower plate-like arms attached at their free ends to the utility pole, the arms being interconnected at their other ends by a platform-like portion on which the insulator is mounted.

In stringing the conductors of power lines, it is common practice to use a block and tackle, the pulley block, or gang traveller, of which is supported from a davit secured to the utility pole in the vicinity of the insulator. The davit usually takes the form of a right-angled bracket secured to the pole by means of a chain which extends around the pole and has to be installed and fastened by a lineman.

. The davits presently in use, which are mounted directly on the utility pole by means of a chain fastening, are generally difficult to install satisfactorily and safely. Furthermore, the method of installation is particularly hazardous to the lineman whose working position is such as to expose him to possible injury, particularly eye injury. Furthermore, such davit installations cause damage to utility poles, and on certain types of poles such as those made of fibreglass or concrete the conventional method of installation is quite unsatisfactory.

The present invention relates to a novel design of tension stringing davit which is adapted to be mounted directly on an existing insulator bracket, thereby to overcome the difficulties and avoid the hazards associated with the installation of conventional davits.

In the erection of utility poles temporary side guy cables are attached to support the pole in its vertical position until permanent side gudy cables are secured. It is common practice to wrap a cable around the pole to attach the temporary side guy cables. The present invention being mounted directly on a existing insulator bracket, overcomes the difficulties and avoids the hazards associated with attachment and removal of conventional temporary side guy cables, and eliminates damage to fibreglass and concrete poles.

The present invention can also be used in the maintenance of power transmission lines by attaching a link stick to the arm member to support live cables while changing a broken insulator or bracket. During installation or maintenance of power lines, a cable may be supported upon the upturned forward end of the gusset plate which defines a cable supporting shoe.

A davit in accordance with the present invention comprises a channel-shaped plate member having a base portion with a pair of upturned, longitudinally extending, side flanges defining a floor area therebetween, the floor area being of a width to receive and accommodate the lower arm of a stand-off bracket. A rigid arm member is fixedly attached to the underside of the base portion of the plate member so as to project longitudinally therefrom beyond one end of the base portion. A gusset plate is rigidly attached, as by welding, to said one end of the base portion of the plate member and also to an upper edge of the projecting portion of the arm member. The side flanges provide a pair of transversely aligned holes positioned to receive a securing pin which, when secured, extends across the lower arm member of the bracket and is locked in the securing position by a locking pin or the like. The davit is constructed so as to provide longitudinally spaced first and second abutment means for restricting movement of the davit along the lower arm of the bracket, and the projecting portion of the rigid arm member is provided with means for attaching a gang traveller, temporary side guy cables, or a link stick, to it.

In order that the invention may be readily understood, one embodiment of the invention and a modification thereof will now be described by way of example with reference to the accompanying drawings.

Figure 2:
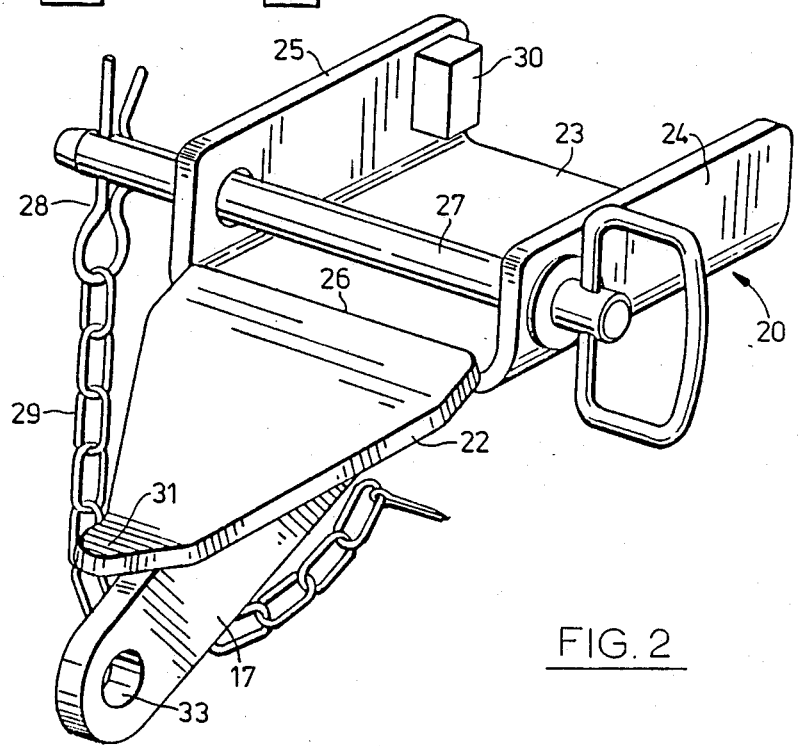

In the drawings:

FIG. 1 is a side elevational view of a davit installed on a utility pole by means of an insulator standoff bracket to which it is directly mounted, and FIG. 2 is a perspective view of the davit.

Referring to FIG. 1, an insulator stand-off bracket 10 comprises upper and lower plate-like arms 11, 12 secured at their free ends to a utility pole 13, and extending outwardly therefrom in a slightly upwardly inclined direction, their outer ends being interconnected by a platform-like portion 14 on which a line insulator 15 is mounted so as to extend outwardly from the bracket. The davit 16 is mounted directly on the lower arm 12 of the bracket, and has an outwardly projecting, downwardly inclined, arm member 17, from the outer end of which a gang traveller 18 or other equipment is suspended by means of a conventional clevis ball adapter generally indicated at 19.

Referring now to FIG. 2, the davit itself comprises essentially a channel-shaped plate member 20, the rigid arm member 17, and a gusset plate 22. The channel-shaped plate member 20 consists of a base portion 23 having a pair of upturned, longitudinally extending, side flanges 24, 25, the side flanges defining a floor area provided by the upper surface of the base portion 23. The floor area is defined by the spacing of the side flanges, and is of the correct width to receive and accommodate the lower arm 12 of the bracket 10. Thus, the plate member 20 provides a rectangular channel along the floor area of which the arm member extends when the davit is mounted on the bracket.

The rigid arm member 17 is welded to the underside of the base portion 23 of the plate member 20 and projects longitudinally therefrom beyond one end of the base portion 23. This arm member is angled with respect to the base portion 23 so that, when the davit is mounted on the bracket, the projecting portion of the arm member extends therefrom in a downwardly inclined direction (see FIG. 1). An eyelet 33 is formed adjacent the free end of the arm member 17 to provide means for suspending the gang traveller 18 or the like as shown in FIG. 1.

To provide rigidity to the assembly, the gusset plate 22 is welded to said one end of the base portion 23 of the plate member, and is welded to the arm member 17 along the upper edge of its projecting portion.

To prevent sliding of the davit along the lower arm of the bracket towards the utility pole, the end of the gusset plate 22 adjacent the plate member 20 is raised with respect to the floor area defined by the base portion 23. The rear edge 26 of the gusset plate thus constitutes an abutment which bears against the platform-like portion 14 of the bracket so as to restrict movement of the davit towards the utility pole.

The side flanges 24, 25 of the plate member 20 provide a pair of transversely aligned holes positioned to receive a securing pin 27 which, when the davit is mounted on the lower arm member of the bracket, extends across the upper surface of the arm member. The pin 27 can be locked in its securing position by means of a locking pin 28, which is conveniently held captive by a chain 29 to be attached to the rigid arm member 17, facilitating insertion of the securing pin 27 from either side. To the inner side of the side flange 25 is attached block member 30. The block member 30 provides a second abutment means for restricting pivotal movement of the davit about the pin 27 relative to the bracket arm 12; such pivotal movement would otherwise occur as the line conductors were lifted from the gang traveller 18 during the stringing operation.

An upturned portion of the forward end of the gusset plate 22 forms a cable supporting shoe 31 which can be used to support cables during the installation or maintenance of power lines.

From the installation point of view, a davit in accordance with the present invention by reason of its being mounted directly on the insulator stand-off bracket, has the advantage that its installation does not cause damage to the utility pole, and is mounted positively thereby avoiding the disadvantage of loosening as may happen with conventional chain fastenings. The davit is safer to install than a chain fastened davit, for the lineman does not have to extend an arm around the pole and so incur the risk of touching live equipment, and does not have to perform a laborious and often dangerous hammering operation to install the davit in position.

I claim:

1. A davit for use in the tension stringing of power lines, the erection of utility poles, and maintenance of power transmission lines, the davit being adapted to be mounted directly on an insulator stand-off bracket having upper and lower plate-like arms extending from a utility pole to which it is secured, the davit comprising:
    a channel-shaped plate member having a base portion with a pair of upturned, longitudinally extending, side flanges defining a floor area therebetween, the floor area being of a width to receive and accommodate the lower arm of a stand-off bracket,
    a rigid arm member fixedly attached to the underside of said base portion and projecting longitudinally therefrom beyond one end of said base portion,
    a gusset plate rigidly attached to said one end of the base portion and to an upper edge of the projecting portion of said arm member,
    a securing pin,
    said side flanges providing a pair of transversely aligned holes positioned to receive the securing pin such that the pin extends across the lower arm member of the bracket when the davit is mounted on the arm member,
    means for locking the pin in the securing position,
    said davit providing longitudinally spaced first and second abutment means for restricting movement of the davit along the lower arm of the bracket, and
    said projecting portion of the rigid arm member providing means for attaching a gang traveller, temporary side guy cables, or link stick thereto.

2. A davit according to claim 1, wherein the gusset plate is attached to said one end of the base portion and to the upper edge of said rigid arm member by welding.

3. A davit according to claim 1, wherein the projecting portion of said rigid arm member is angled with respect to said base portion of the plate member so as to extend therefrom in a downwardly inclined direction when the davit is mounted.

4. A davit according to claim 1, wherein the end of the gusset plate adjacent the plate member is raised with respect to said floor area thus defining the first abutment means.

5. A davit according to claim 1, wherein the second abutment means is defined by a block welded to the inner side of one of the side flanges.

6. A davit for use in the tension stringing of power lines, the erection of utility poles, and maintenance of power transmission lines, the davit being adapted to be mounted directly on an insulator stand-off bracket having upper and lower plate-like arms extending from a utility pole to which it is secured, the davit comprising:
    a channel-shaped plate member having a base portion with a pair of upturned, longitudinally extending, side flanges defining a floor area therebetween, the floor area being of a width to receive and accommodate the lower arm of a stand-off bracket,
    a rigid arm member fixedly attached to the underside of said base portion and projecting longitudinally therefrom beyond one end of said base portion,
    a gusset plate extending longitudinally and downwardly inclined from one end of the base portion, and rigidly attached to an upper edge of the projecting portion of said arm member,
    a securing pin,
    said side flanges providing a pair of transversely aligned holes positioned to receive the securing pin such that the pin extends across the lower arm member of the bracket when the davit is mounted on the arm member,
    means for locking the pin in the securing position,
    said davit providing longitudinally spaced first and second abutment means for restricting movement of the davit along the lower arm of the bracket, and
    said projecting portion of the rigid arm member providing means for attaching a gang traveller, temporary side guy cables or a link stick thereto.

7. A davit according to claim 6, wherein the upper edge of said rigid arm member is welded to the underside of said base portion and extending gusset plate.

* * * * *